United States Patent [19]

Kott et al.

[11] Patent Number: 5,211,846

[45] Date of Patent: May 18, 1993

[54] REPLACEMENT FILTER CARTRIDGE ASSEMBLY

[75] Inventors: Leonard B. Kott; Aaron D. Kott, both of N. Massapequa, N.Y.

[73] Assignee: Pleatco Electronic & Filter Corp., West Babylon, N.Y.

[21] Appl. No.: 559,321

[22] Filed: Jul. 30, 1990

[51] Int. Cl.$^5$ .............................................. B01D 27/06
[52] U.S. Cl. ................... 210/232; 210/450; 210/493.2; 210/493.5; 210/494.1; 210/497.2; 55/492; 55/498; 55/500; 55/502; 55/521
[58] Field of Search ............... 210/232, 450, 493.1, 210/493.2, 493.4, 493.5, 494.1, 494.2, 494.3, 497.01, 497.2; 55/490, 492, 495, 497, 498, 499, 500, 502, 521

[56] References Cited

U.S. PATENT DOCUMENTS

| | | |
|---|---|---|
| 2,371,895 | 3/1945 | Kingman . |
| 2,641,365 | 6/1953 | Lundeen . |
| 3,647,083 | 3/1972 | Niccum et al. . |
| 3,720,322 | 3/1973 | Harms . |
| 3,750,889 | 8/1973 | Acosta ..................... 210/497.01 |
| 3,767,054 | 10/1973 | Farrow et al. ................. 210/497.01 |
| 3,957,634 | 5/1976 | Orensten et al. . |
| 4,022,690 | 5/1977 | Smith . |
| 4,108,775 | 8/1978 | Wilkes et al. . |
| 4,187,179 | 2/1980 | Harms . |
| 4,561,979 | 12/1985 | Harms et al. . |
| 4,783,258 | 11/1988 | Willinger et al. . |
| 4,810,379 | 3/1989 | Barrington .................... 210/497.01 |
| 4,877,521 | 10/1989 | Petrucci et al. . |
| 4,880,549 | 11/1989 | Willinger et al. . |
| 5,006,242 | 4/1991 | Sato et al. ........................... 210/232 |
| 5,015,375 | 5/1991 | Fleck ............................... 210/493.5 |

FOREIGN PATENT DOCUMENTS

| | | |
|---|---|---|
| 957620 | 11/1974 | Canada . |
| 1282685 | 12/1960 | France . |
| 622 | of 1853 | United Kingdom . |

*Primary Examiner*—Robert A. Dawson
*Assistant Examiner*—W. L. Millard
*Attorney, Agent, or Firm*—Hoffman & Baron

[57] ABSTRACT

A replacement filter cartridge assembly includes a filter cartridge element and a reusable supporting core assembly. The filter cartridge element is cylindrical in shape and has top and bottom end caps. Either the top end cap or the bottom end cap has an opening formed through its thickness which communicates with a central bore extending longitudinally through the filter cartridge element. The supporting core assembly includes a perforated tubular core and a sealing end cap mounted on one end of the core. The core is inserted through the top or bottom end cap opening and into the central bore of the filter cartridge element. The sealing end cap rests against either the top or bottom end cap of the filter cartridge element, while the other end of the tubular core contacts the inner side of the opposite end cap of the cartridge element. The supporting core is removable from the filter cartridge element when the filter cartridge needs to be replaced or cleaned, and may be reused on a clean filter cartridge element.

16 Claims, 12 Drawing Sheets

FIG. 2
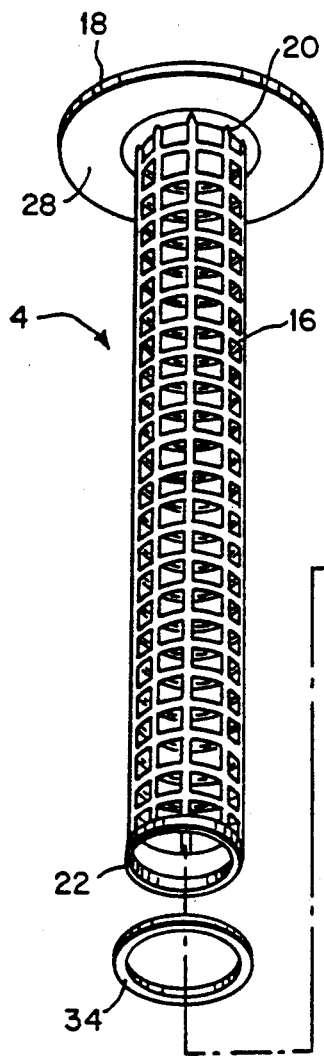
FIG. 4
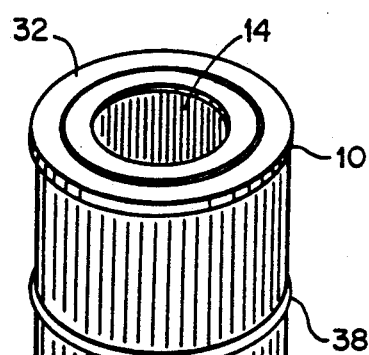
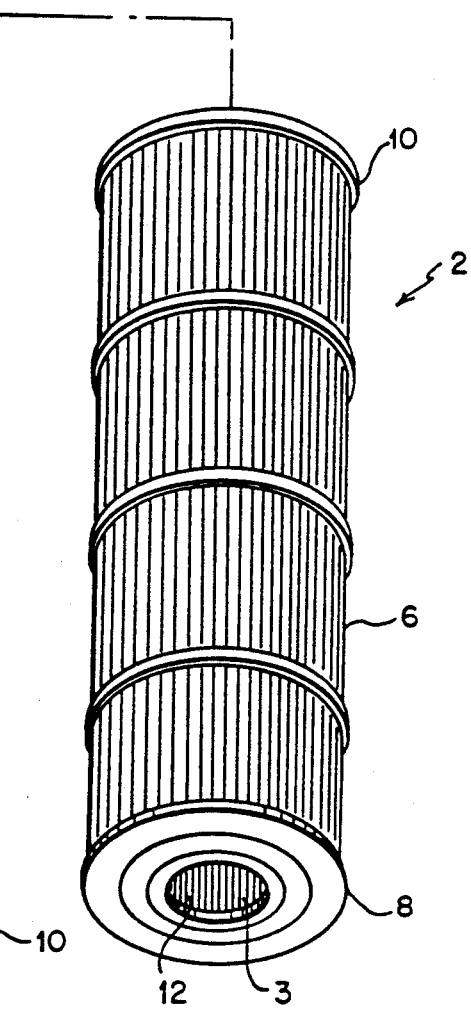
FIG. 4a
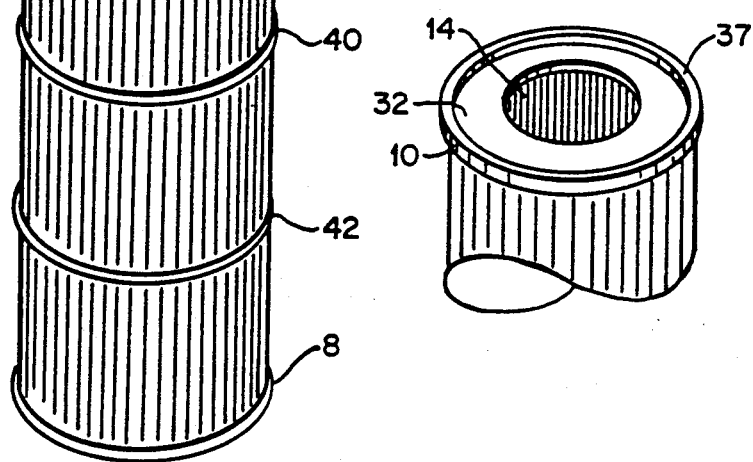

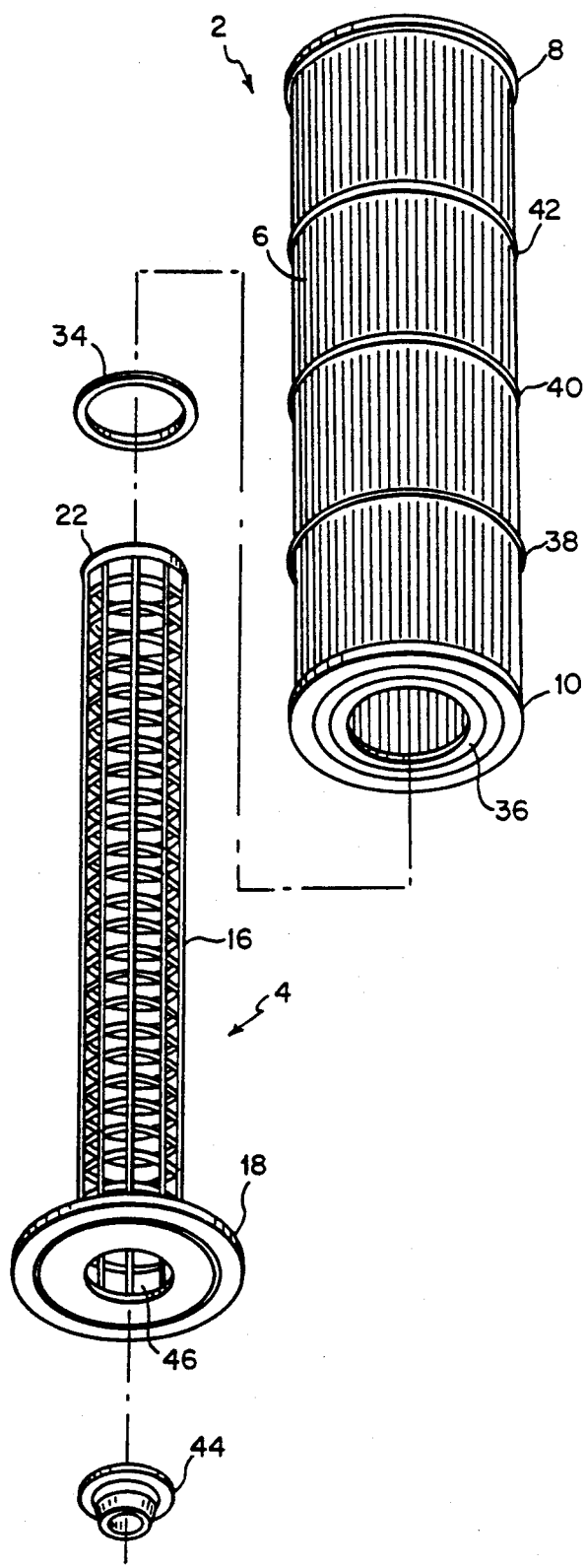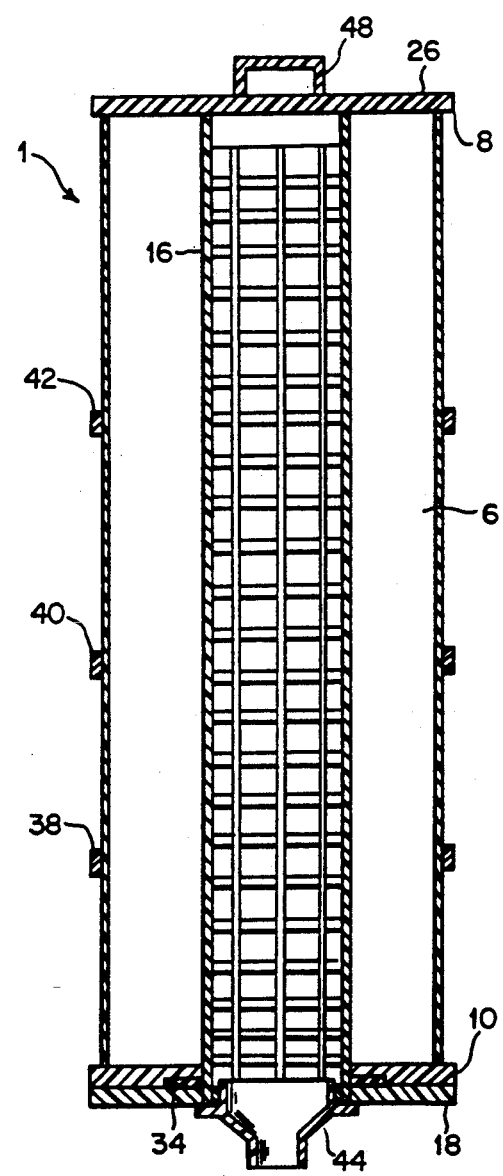

FIG. 8
FIG. 9
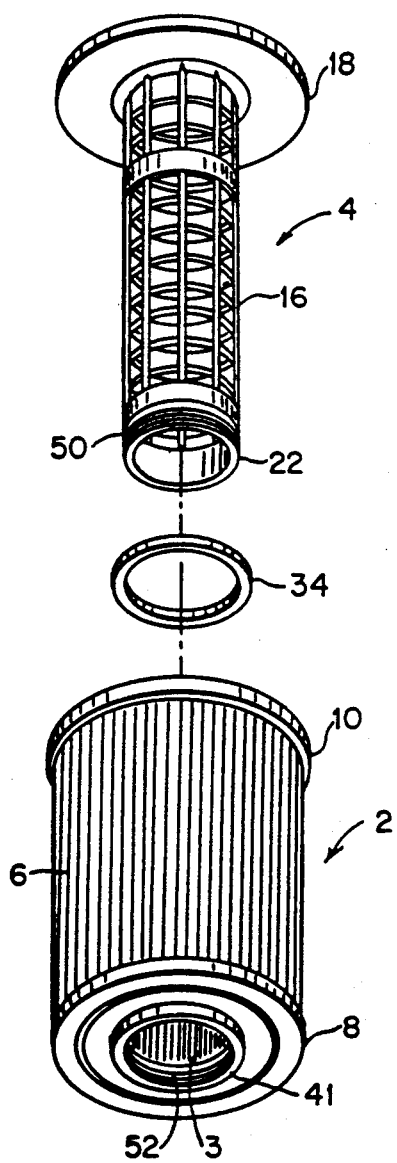
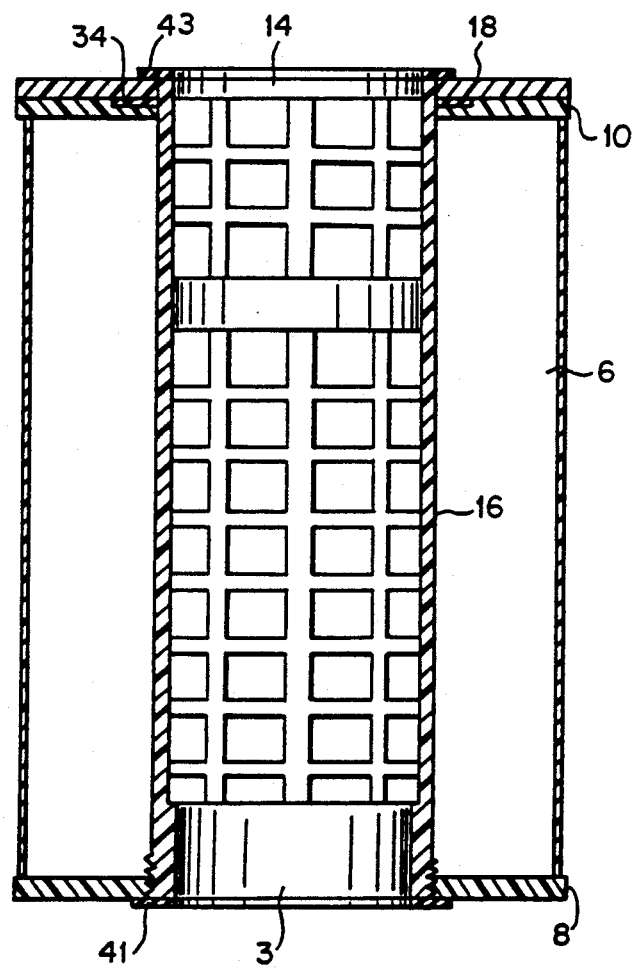

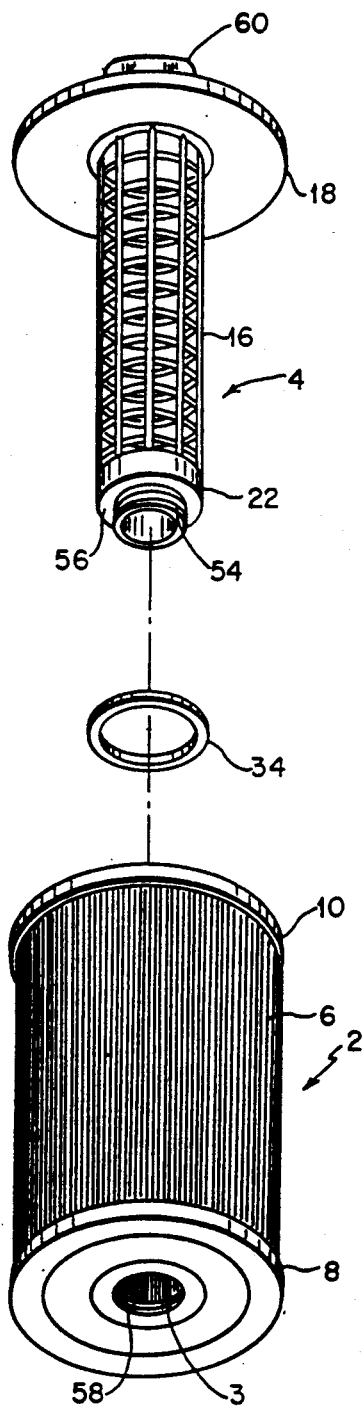
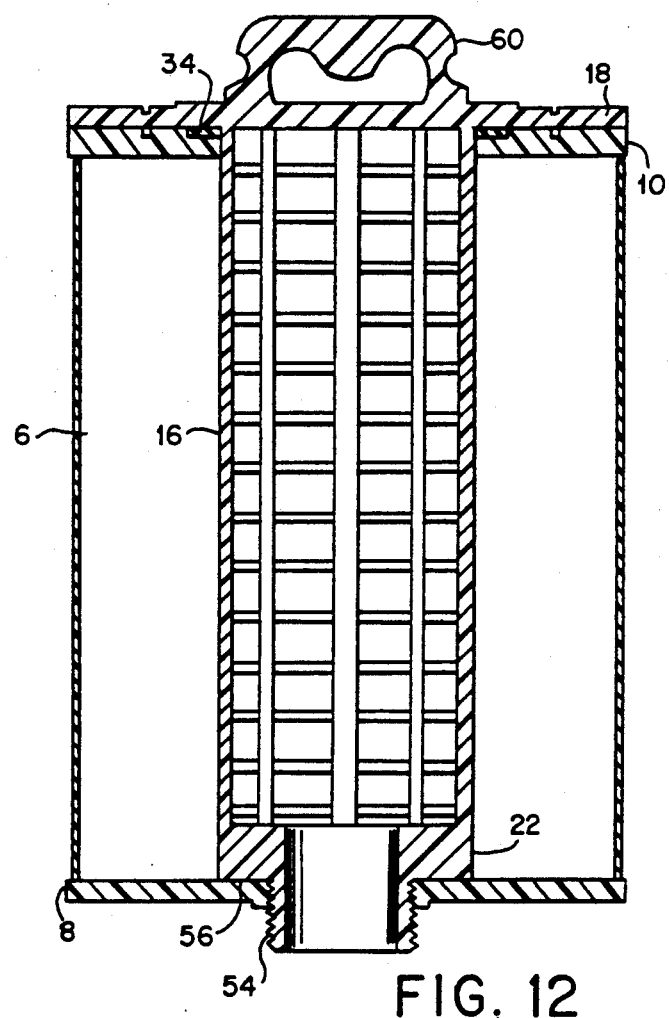
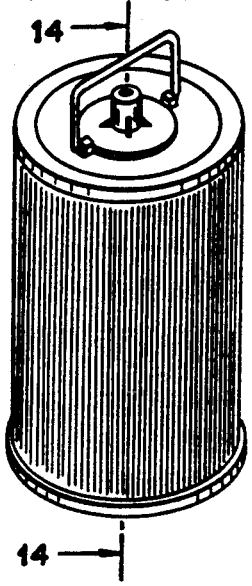

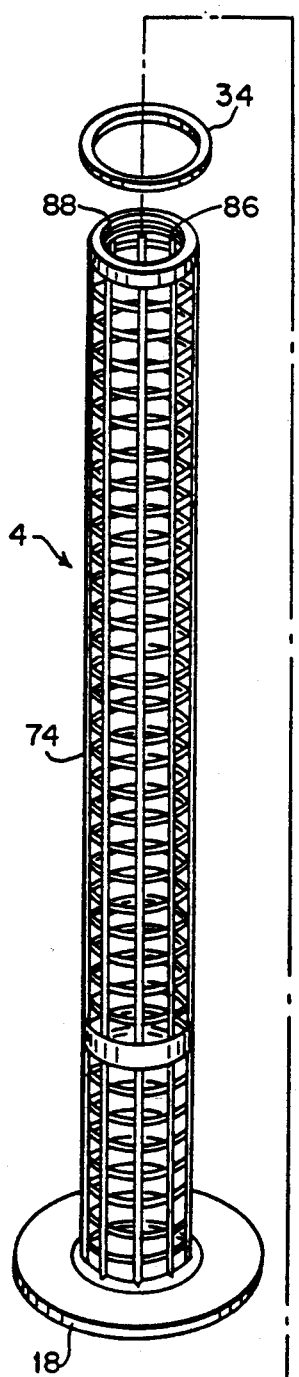
FIG. 16
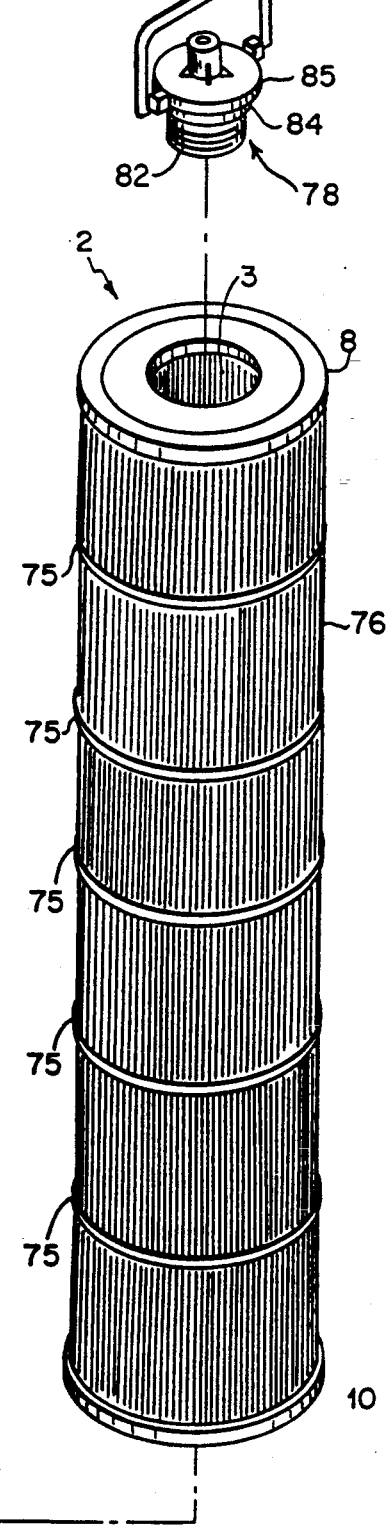
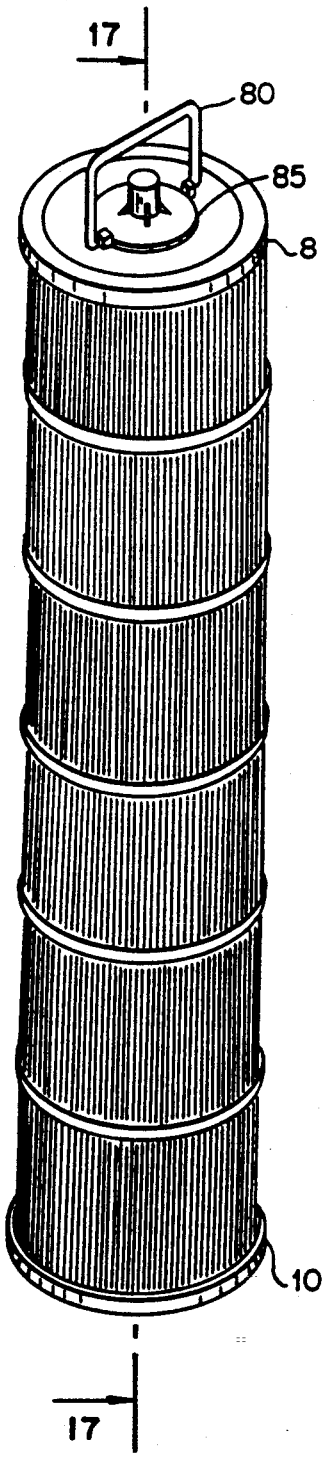
FIG. 15

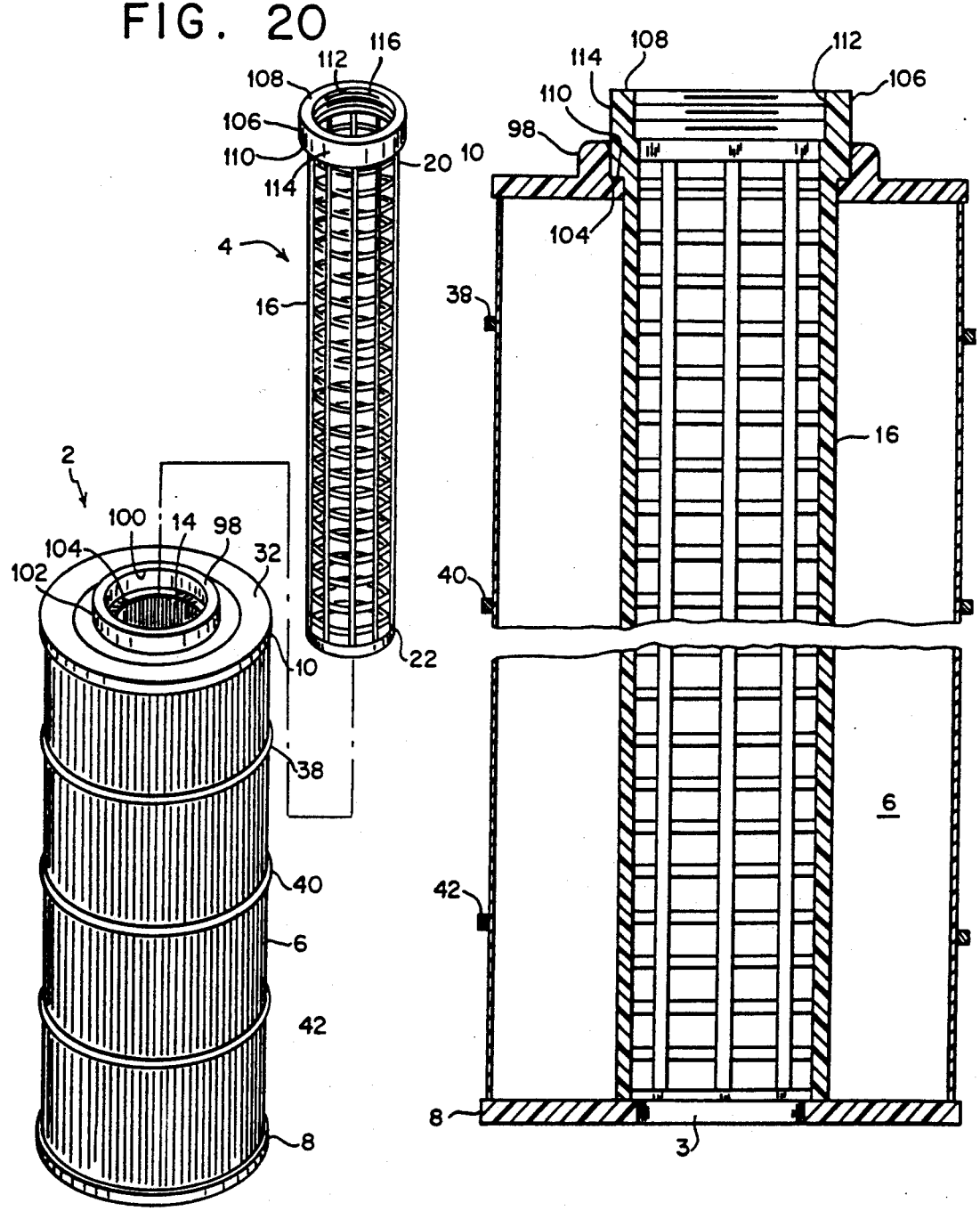

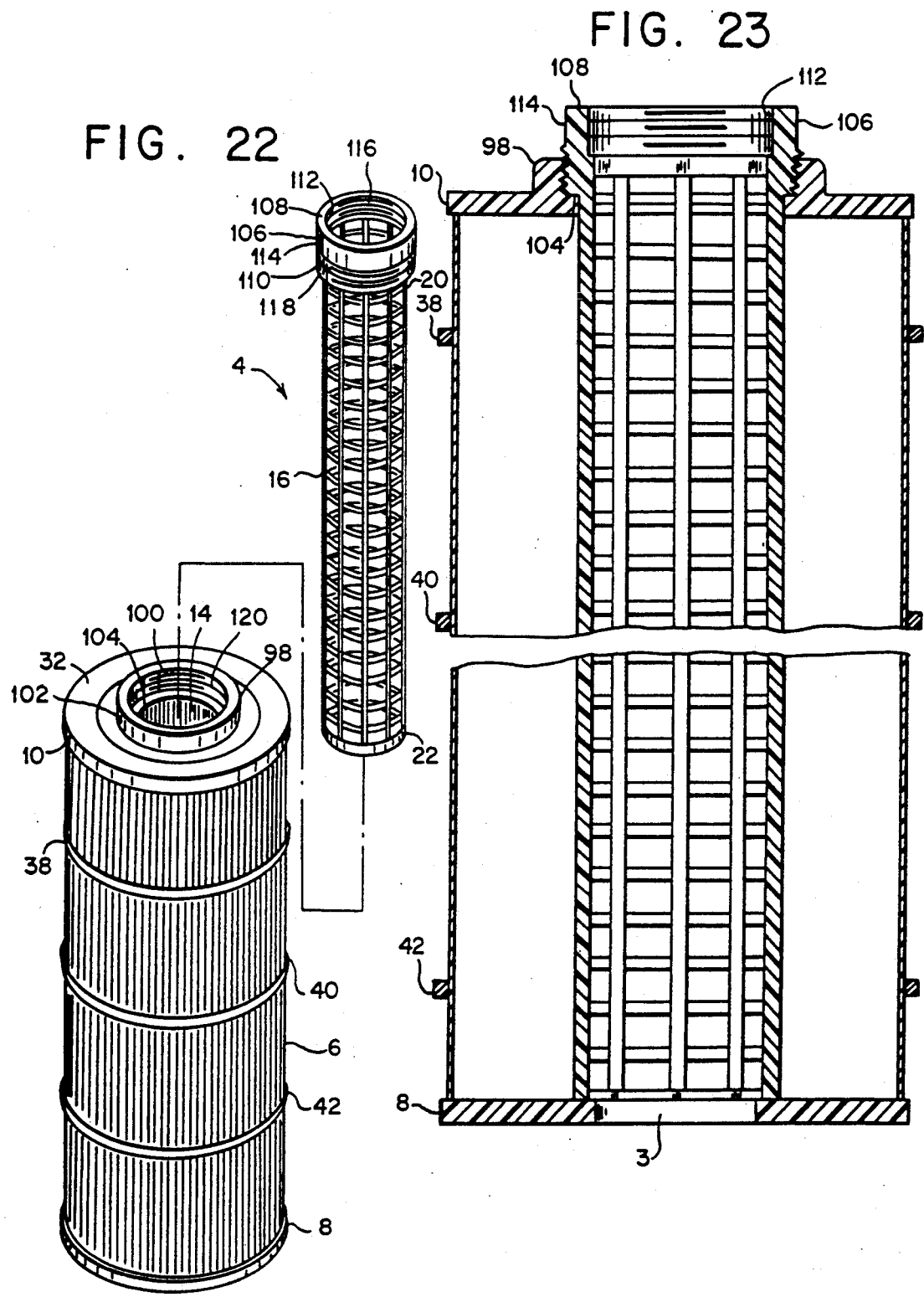

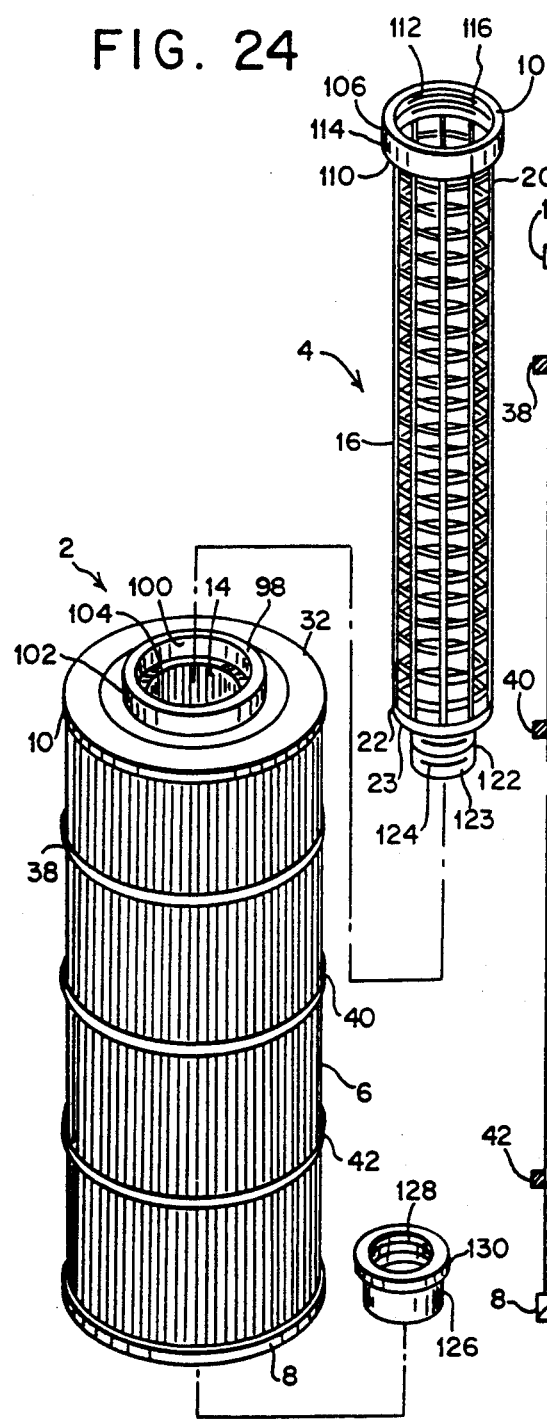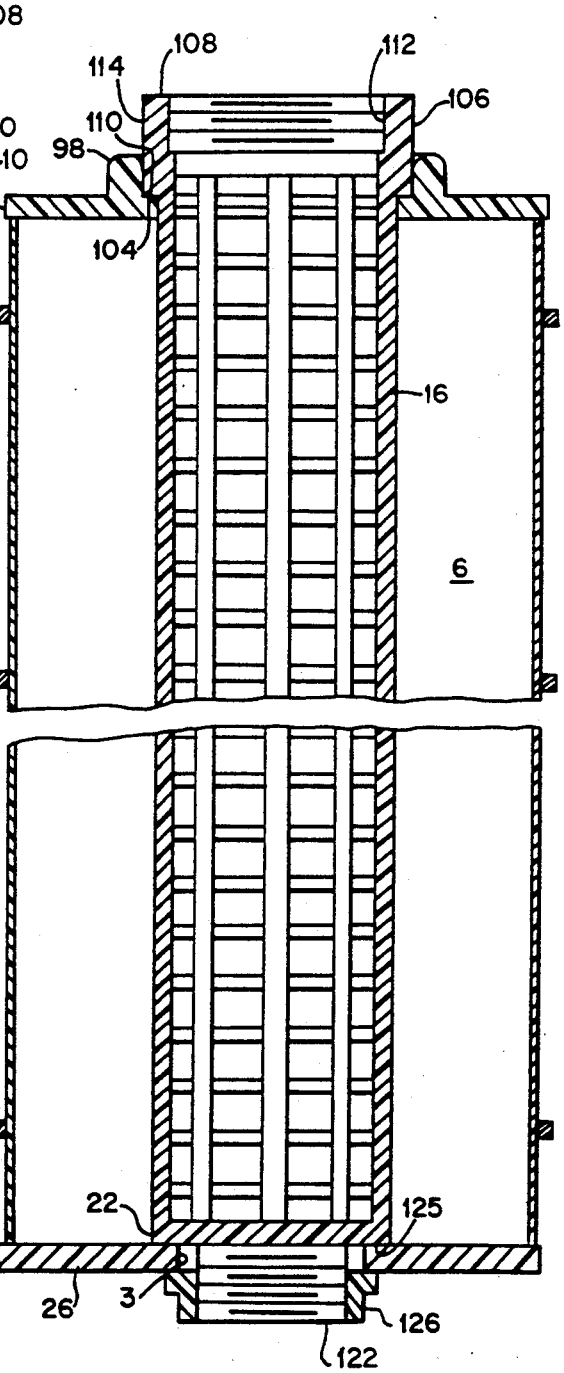

REPLACEMENT FILTER CARTRIDGE ASSEMBLY

BACKGROUND OF THE INVENTION

1. Field of the Invention

The present invention relates generally to filtering apparatus, and more specifically relates to filter units for use in filtering liquids or, more particularly, for use in aquatic environments such as pools, whirlpool-type tubs, and the like. Even more specifically, the invention relates to a replacement filter cartridge assembly.

2. Description of the Prior Art

Many conventional filter cartridge assemblies include a filter cartridge having a filter medium, and a core set permanently in the filter cartridge. A disadvantage of such conventional filter cartridges is that the filter core is not removable from the filter cartridge. Thus, when replacing the filter cartridge assembly, the user discards the core assembly and the filter cartridge.

U.S. Pat. No. 4,108,775 to Wilkes et al. discloses a filter apparatus having an advantage over other conventional units in that the filter apparatus includes a filter cartridge and a core assembly which is removable from the cartridge. As shown in FIGS. 5 and 6 of the Wilkes et al. patent, the filter cartridge includes a pleated filter medium 186 and top and bottom disk-shaped end caps 190, 192 fixed to the ends of the pleated medium. The filter cartridge is formed with a central opening 188 which extends through each end so that the cartridge fits snugly about the core assembly 140.

A disadvantage of the filter apparatus disclosed in the Wilkes et al. patent is that the core assembly provides minimal, if any, longitudinal support for the filter cartridge which may be due at least in part to the core assembly passing through the filter cartridge disk-shaped end caps and engaging the end caps only at their inner peripheral edges which define the opening 188. The pleated medium also does not provide sufficient longitudinal support. Thus, the filter cartridge may be damaged or deformed due to water suction when operating the filter.

Under normal operating conditions in either a pressurized or vacuum skim filter cartridge system, the filter cartridge element is subjected to substantial lateral and longitudinal pressures. These pressures are created by the flow of dirty water through the filter medium and the filtered clean water moving downwardly and exiting the filter housing and returning to the pool. The suction created tends to deform the shape of the filter cartridge. As the filter cartridge becomes dirty, resistance to water flow through the filter increases and greater pressure is exerted longitudinally and laterally on the filter cartridge, which may cause the cartridge to deform or collapse. The distortion in the shape of the filter cartridge may cause water to by-pass the filter medium through areas opened by the distortion. This may allow unfiltered water to reenter the pool.

Further, the distortion of the filter cartridge resulting from the lack of longitudinal support may damage the disk-shaped end caps of the filter cartridge. Thus, the lack of longitudinal support to counter compressive forces leaves the Wilkes et al. filter apparatus susceptible to malfunction.

OBJECTS AND SUMMARY OF THE INVENTION

It is an object of the present invention to provide a replacement filter cartridge assembly with a reusable supporting core assembly and a replacement filter cartridge element.

It is a further object of the present invention to provide a replacement filter cartridge assembly which employs a reusable core with a reusable sealing end cap assembly, and which can provide longitudinal as well as lateral support to the filter cartridge element.

It is another object of this invention to provide a replacement filter cartridge assembly applicable to a variety of different circumstances and environments.

It is yet a further object of the present invention to provide a replacement filter cartridge assembly which is easily assembled and disassembled.

It is still a further object of the invention to provide a replacement filter cartridge assembly which results in a cost savings to the consumer, as it is only necessary to replace the filter cartridge element, and the core assembly of the filter cartridge assembly is reusable.

It is yet another object of the present invention to provide a replacement filter cartridge assembly having a reusable core, which minimizes the affect on the environment by eliminating the need to discard the core as in conventional filter assemblies.

It is yet another object of the invention to provide a replacement filter cartridge assembly which overcomes the inherent disadvantages of known filter cartridge assemblies.

According to one form of the present invention, there is provided a replacement filter cartridge assembly including a filter cartridge element and a reusable supporting core assembly.

The filter cartridge element has a cylindrically arranged pleated filter medium with top and bottom end caps on each end. Either the top end cap or the bottom end cap has a hole which communicates with a central bore extending longitudinally through the filter cartridge. One of the top and bottom end caps of the replacement filter cartridge element is dimensioned to be compatible to that of the original cartridge element supplied by the original manufacturer so as to be adapted to be received by and work with the manufacturer's filtering apparatus for which it was intended.

The reusable supporting core assembly includes a perforated tubular core and a sealing end cap mounted on one end of the tubular core. The sealing end cap may also be diminished to be compatible to the end cap of the original cartridge element which the replacement filter cartridge assembly is intended to replace. The tubular core is inserted through either the top or bottom end cap hole and into the central bore of the filter cartridge element. The sealing end cap rests against either the top or the bottom end cap of the filter cartridge element to support and seal that particular end cap, while the other end of the tubular core contacts the inner side of the opposite end cap of the filter cartridge element. This arrangement enables the core assembly to support the filter cartridge element. The supporting core is removable from the filter cartridge element when the filter cartridge element needs to be replaced, and may be reused on a clean filter cartridge element.

Preferred forms of the replacement filter cartridge assembly, as well as other embodiments, objects, features and advantages of this invention, will be apparent

BRIEF DESCRIPTION OF THE DRAWINGS

FIG. 2 is an exploded view of the filter cartridge assembly shown in FIG. 1.

FIG. 4 is a top perspective view of the filter cartridge shown in FIG. 1.

FIG. 4a is a perspective view of one form of an end cap used on the filter cartridge element of the present invention.

FIG. 6 is an exploded view of the filter cartridge assembly shown in FIG. 5.

FIG. 7 is a cross sectional view of the filter cartridge assembly shown in FIG. 6 taken along the longitudinal axis.

FIG. 8 is an exploded view of a third embodiment of the filter cartridge assembly of the present invention.

FIG. 9 is a cross sectional view of the filter cartridge assembly shown in FIG. 8 taken along the longitudinal axis.

FIG. 10 is an exploded view of a fourth embodiment of the filter cartridge assembly of the present invention.

FIG. 11 is a cross sectional view of the filter cartridge assembly shown in FIG. 10 taken along the longitudinal axis.

FIG. 12 is a top perspective view of a fifth embodiment of the filter cartridge assembly of the present invention.

FIG. 15 is a top perspective view of a sixth embodiment of the filter cartridge assembly of the present invention.

FIG. 16 is an exploded view of the filter cartridge assembly shown in FIG. 15.

FIG. 20 is an exploded view of an eighth embodiment of the filter cartridge assembly of the present invention.

FIG. 21 is a cross sectional view of the filter cartridge assembly shown in FIG. 20 taken along the longitudinal axis.

FIG. 22 is an exploded view of a ninth embodiment of the filter cartridge assembly of the present invention.

FIG. 23 is a cross sectional view of the filter cartridge assembly shown in FIG. 22 taken along the longitudinal axis.

FIG. 24 is an exploded view of a tenth embodiment of the filter cartridge assembly of the present invention.

FIG. 25 is a cross sectional view of the filter cartridge assembly shown in FIG. 24 taken along the longitudinal axis.

DETAILED DESCRIPTION OF THE PREFERRED EMBODIMENTS

Figure 1:
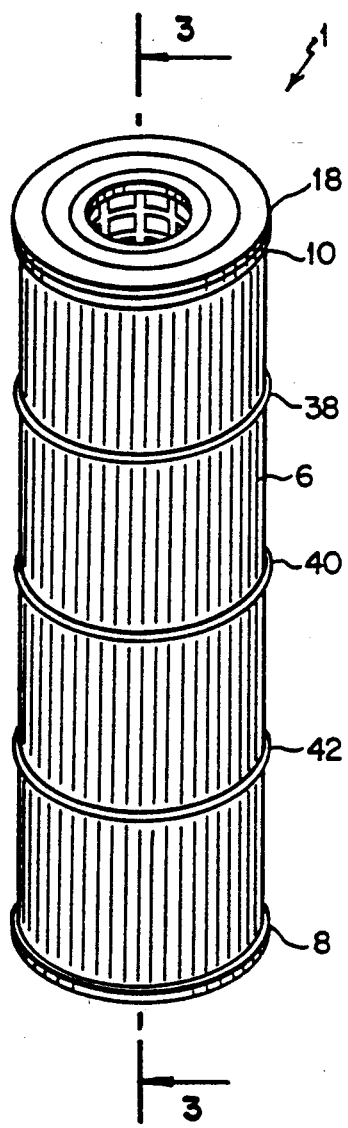
FIG. 1 is a top perspective view of a first embodiment of the filter cartridge assembly of the present invention.

Referring now to FIGS. 1-4 of the drawings, it is seen that a filter cartridge assembly 1 for use in filtering a liquid or, more specifically, for use in aquatic environments, such as pools, whirlpool-type tubs, and the like and constructed in accordance with a first embodiment of the present invention basically includes a filter cartridge element 2, and a reusable supporting core assembly 4. The filter cartridge element 2 preferably includes a pleated filter medium 6, and opposite first and second end caps 8 and 10. The pleated filter medium may be a material such as spun bonded 100% polyester. For example, spun bonded polyester commercially available under the trademark Reemay ® may be used.

The first and second end caps 8 and 10 define respective axial ends of the filter cartridge element 2. The end caps 8 and 10 are preferably affixed to opposite axial ends of the filter medium by immersing the ends of the filter medium into a liquid capable of hardening about the end. For example, using liquid polyurethane as the hardening liquid is in accordance with the invention.

Preferably, the filter medium 6 is arranged cylindrically. This arrangement will define a central bore 12 extending longitudinally through the filter cartridge medium 6.

An opening 14 is formed through the thickness of the second end cap 10 of the filter cartridge element 2. The opening 14 communicates with the central bore 12. As will be described, the opening 14 allows the filter cartridge element to be removably mounted on the supporting core assembly.

The reusable supporting core assembly 4 includes a perforated tubular core 16, and a sealing end cap 18 having opposite inner and outer surfaces 28, 30. Polypropylene, PVC, ABS or the like may be used to form the tubular core 16. The tubular core 16 has a second axial end 20 and an opposite first axial end 22. The second axial end 20 has the sealing end cap 18 affixed to it.

The filter cartridge element 2 receives the perforated tubular core 16. The supporting core assembly 4 couples with the filter cartridge element 2 to provide longitudinal support to the filter cartridge element 2. To allow the supporting core assembly 4 to couple with the filter cartridge element 2, the opening 14 in the filter cartridge second end cap 10 has the necessary diameter to receive the tubular core 16. The tubular core 16 preferably has a predetermined length such that the first axial end 22 of the tubular core 16 is engagable with the inner surface 24 of the first end cap 8 and thus provides longitudinal support for the filter cartridge element.

Further, the inner surface 28 of the sealing end cap 18 of the core assembly 4 preferably rests against the outer surface 32 of the second end cap 10 of the cartridge element to support the second end cap and filter cartridge element 2 and to seal the second end cap 10 of the filter cartridge element. The supporting core assembly with its core and sealing end cap is easily removable from the filter cartridge element when the filter cartridge element needs to be replaced or cleaned, and may be reused on a clean filter cartridge element.

As mentioned above, the sealing end cap 18 also seals the core assembly to the filter cartridge element. For this purpose, a seal 34 may be used between the sealing end cap inner surface 28 and the outer surface 32 of the filter cartridge second end cap 10. The seal 34 has an inner diameter which is greater than the diameter of the perforated tubular core 16 so that it may be mounted on the tubular core 16. A recess 36 is formed in the outer surface 32 of the second end cap 10 and is dimensioned to at least partially receive seal 34, although it is envisioned to form the recess 36 in the inner surface 28 of the sealing end cap to at least partially receive the seal 34 and to provide a comparable seal between the sealing end cap and the bottom end cap.

The filter cartridge element may include straps 38, 40 and 42 mounted circumferentially about filter medium 6. Straps 38, 40 and 42 may be formed from a spun bonded polyester such as Reemay ® or the like. The straps 38, 40 and 42 are preferably attached to the filter medium 6 by melting the straps around the circumference of the filter medium 6. The straps assist in maintaining the cylindrical shape of the filter medium 6, and help to maintain separation between the pleats of the pleated filter medium 6.

To further ensure that a watertight seal is formed between the core assembly and the filter cartridge element, the second end cap 10 of the filter cartridge element may include a stepped or raised ring 37 protruding from the outer surface 32 of the end cap at the periphery of the end cap, as shown in FIG. 4a. The raised ring 37 engages the inner surface 28 of the sealing end cap 18 when the core assembly is mounted on the filter cartridge element and forms a seal with the sealing end cap.

Figure 3:
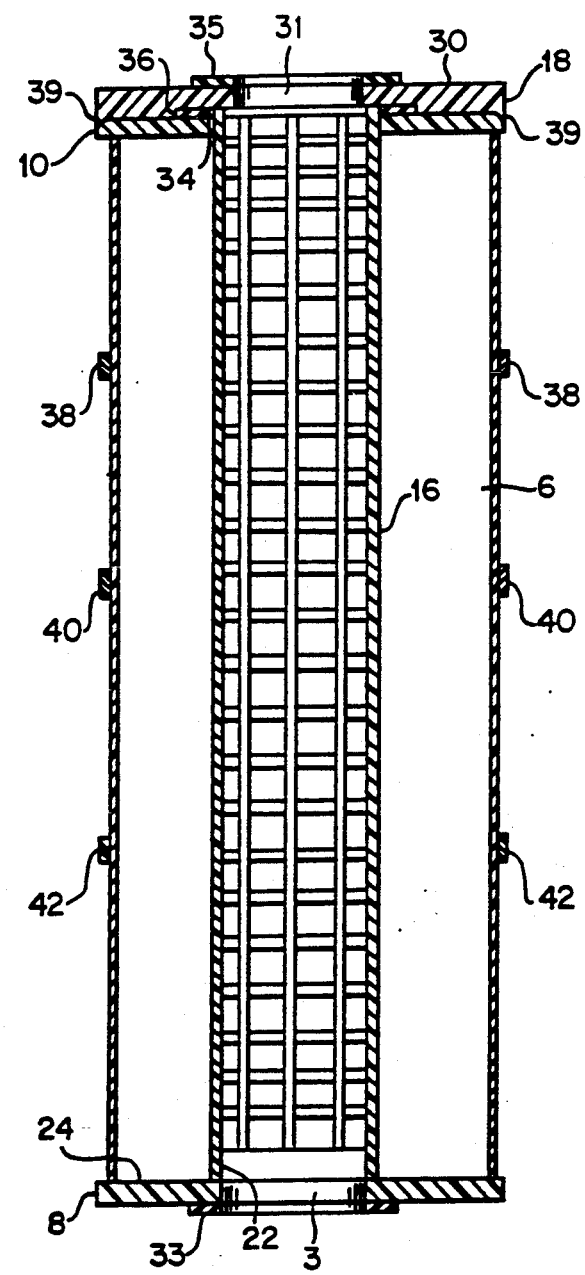
FIG. 3 is a cross sectional view of the filter cartridge assembly shown in FIG. 1 taken along line 3—3.

Additionally, the sealing end cap 18 may be formed with a reach or edge lip 39 surrounding the peripheral edge of the sealing end cap, which edge lip 39 engages the peripheral edge portion of the second end cap 10 of the cartridge element, as shown by FIG. 3 of the drawings, to help form a watertight seal between the sealing end cap 18 and the second end cap 10.

In some applications and to conform to the specifications of the manufacturer of the original filter cartridge element, it may be desirable to form an opening through one or both end caps of the filter cartridge element. Accordingly, the embodiment of the invention described above may further have an opening 3 formed through the thickness of the first end cap 8 of the filter cartridge element 2, as shown in FIG. 2. The opening 3 communicates with the central bore 12. As described below, the opening is dimensioned to be smaller than the diameter of the core such that the core's first axial end 22 can still engage the filter cartridge first end cap 8. Also, the sealing end cap 18 may include an opening 31 formed through its thickness, which opening is in communication with the central bore 12 of the filter cartridge element. This opening 31 may be desired when using the replacement filter cartridge assembly in various applications, for example, so that it is compatible with the original manufacturer's filter unit. Finally, the predetermined overall length of the replacement filter cartridge assembly of the present invention is such that it enables the replacement filter cartridge element and the reusable core with the sealing end cap to be secured in place by the original filter canister housing, thus ensuring both a watertight seal and compatibility with the original equipment. Additional sealing rings 33, 35 may be respectively mounted on the outer surfaces of the first end cap 8 and the sealing end cap 18 for overall watertight sealing of the replacement filter cartridge assembly.

Figure 5:
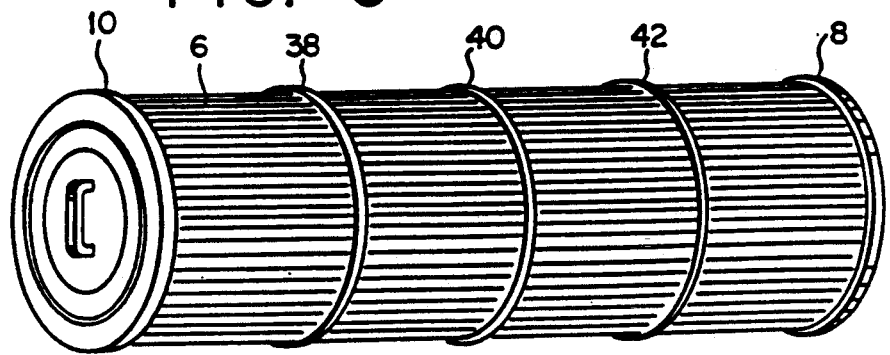
FIG. 5 is a partial, top perspective view of a second embodiment of the filter cartridge assembly of the present invention.

A second embodiment of the filter cartridge assembly 1 previously described is shown in FIGS. 5, 6 and 7. The filter cartridge assembly 1 includes a filter cartridge element 2 and a supporting core assembly 4 with its associated seal 34 as in the previous embodiment shown in FIGS. 1-4. However, in the embodiment shown in FIGS. 5-7, the filter cartridge assembly 1 further includes a nipple 44 in the form of a tubular structure. The core assembly sealing cap end 18 has an opening 46 formed through its thickness to receive the nipple 44. The nipple 44 allows convenient mounting of the filter cartridge assembly 1 on a mating receiving fixture. A compatible filter canister made by the original manufacturer and designed to receive the filter cartridge assembly 1 may include such a receiving fixture.

Also, the filter cartridge first end cap 8 preferably includes a handle 48 mounted on its outer surface 26. The handle 48 enables easy lifting and carrying of the entire filter cartridge assembly 1, as well as assisting in engaging and disengaging the filter cartridge element 2 from the supporting core assembly 4.

A third embodiment of the filter cartridge assembly 1 previously described is shown in FIGS. 8 and 9. The filter cartridge assembly 1 includes a filter cartridge 2 and supporting core assembly 4 as in the previous embodiment shown FIGS. 1-4. However, in the embodiment shown in FIGS. 8 and 9, the first axial end 22 of the tubular core 16 includes a threaded portion 50 on its outer periphery.

Also, the first end cap 8 of the filter cartridge element includes an opening 3 formed through the thickness in the first end cap 8. The inner peripheral edge of end cap 8 which defines the opening has threads 52 formed in its surface which are designed to mate with the threaded portion 50 of the tubular core 16. Coupling the tubular core threaded portion 50 and the end cap threaded portion 52 secures the filter cartridge element 2 and the core assembly 4 together and provides longitudinal support for cartridge element 2. The core assembly 4 and the filter cartridge element 2 may be easily uncoupled by unscrewing the core assembly from the cartridge element. Additional sealing rings 41, 43 may be respectively mounted on the outer surfaces of the first end cap 8 and the sealing end cap 18 to make the replacement filter cartridge assembly comparable to the filter cartridge of the original manufacturer and compatible to the filtering apparatus for which the original filter cartridge was intended.

A fourth embodiment of the filter cartridge assembly 1 previously described is shown in FIGS. 10 and 11. The filter cartridge assembly 1 includes a filter cartridge element 2 and a supporting core assembly 4 as in the previous embodiment shown in FIGS. 1-4. However, in the embodiment of FIGS. 10 and 11, the tubular core 16 includes a threaded portion 54 having a cylindrical shape and extending from the first axial end 22 of the tubular core 16. The threaded portion 54 is of lesser diameter than the core 16 to define a shoulder 56 situated at the axial end of the core.

Further, the first end cap 8 of the filter cartridge element has an opening 3 formed through the thickness of the first end cap 8. The opening 3 includes a threaded portion 58 formed in the perimeter of the opening. The threaded portion 54 of the first axial end 22 of the tubular core 16 mates with the threaded portion 58 on the perimeter of the opening 3 of the filter cartridge first end cap 8 to secure the filter cartridge element to the core assembly. The shoulder 56 rests against the inside surface of end cap 8. Thus, the core assembly 4 provides longitudinal support for the cartridge element 2.

The end portion of threaded portion 54 of the core assembly may extend beyond the outer surface of first end cap 8. This extended portion is provided to engage with a threaded fitting (not shown) mounted in the housing of the filter apparatus for which the replacement filter cartridge is intended to be used. The clean water exits this fitting.

Also, the core assembly sealing end cap 18 includes a handle 60. The handle 60 is mounted on the outer surface 30 of the core assembly sealing end cap 18. The handle 60 may be used to facilitate engaging or disengaging the core assembly 4 from the filter cartridge element 2. The handle 60 may also be used for easily lifting and carrying the core assembly 4 or the entire filter cartridge assembly 1.

Figures 13, 14:
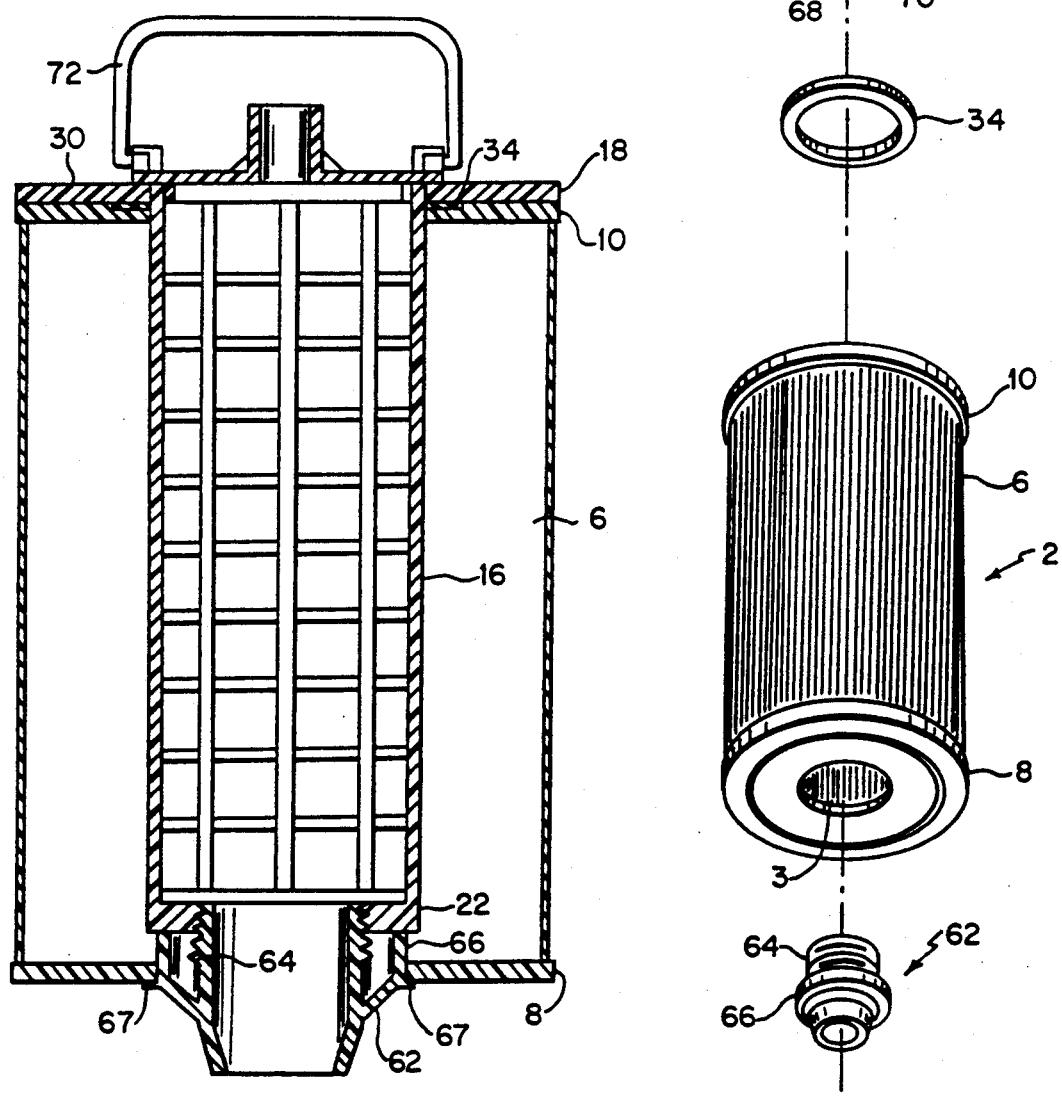
FIG. 13 is an exploded view the filter cartridge assembly shown in FIG. 12.
FIG. 14 is a cross sectional view of the filter cartridge assembly shown in FIG. 12 taken along the line 14—14.

A fifth embodiment of the filter cartridge assembly 1 previously described is shown in FIGS. 12, 13 and 14. The filter cartridge assembly 1 includes a filter cartridge element 2 and supporting core assembly 4 as in the previous embodiment shown in FIGS. 1-4. However, in the embodiment shown in FIGS. 12-14, the first end cap 8 of the filter cartridge element has an opening 3 formed through its thickness and communicating with the filter cartridge central bore 12.

As described below, the opening 3 allows a nipple 62 to be mounted therein. The filter cartridge assembly 1 includes nipple 62 in the form of a tubular structure including a lower threaded portion 64 and having a flange 66 extending radially from the main body of the nipple. The flange 66 includes a lip 67 protruding from its periphery. The nipple 62 is removably mounted on the end cap 8 by having the flange 66 snugly received by the opening 3 with the lip 67 resting against the outer surface 26 of the end cap 8. When mounted to the end cap 8 in this manner, the nipple 62 has its threaded portion 64 projecting into the central bore 12 of the filter cartridge element. The nipple is provided for mating to a bottom fitting (not shown) provided on certain manufactured filter canisters.

The first axial end 22 of the tubular core has a threaded portion 68 formed in its inner surface perimeter 70. The design of the tubular core threaded portion 68 is such that it mates with the nipple threaded portion 64. Engaging the mating threads on the tubular core 16 and the nipple 62 secures the core assembly 4 and filter cartridge element 2 together.

The core assembly 4 in conjunction with the nipple 62 provides longitudinal support to the filter cartridge element 2. When the nipple 62 is threaded into the core 16 with the filter cartridge element 2 mounted on the core, the lip 67 rests against the outer surface of the filter cartridge end cap 8 to help retain the filter cartridge element on the core assembly. If pressure is exerted on the end cap 8 of the filter cartridge element, the inside surface of the end cap 8 will engage the axial end 22 of the core 16, as the diameter of opening 3 is made smaller than the outer diameter of the core 16.

Also, the core assembly sealing end cap 18 may include a handle 72. The sealing end cap outer surface 30 has the cap handle 72 mounted on it. The sealing end cap handle 72 assists in disengaging the core assembly 4 from the filter cartridge element 2. The handle 72 allows easy lifting and carrying of the core assembly 4 or the entire filter cartridge assembly 1. Finally, the predetermined overall length of the replacement filter cartridge assembly is such that the entire assembly may be secured in place by the original filter canister housing.

Figure 17:
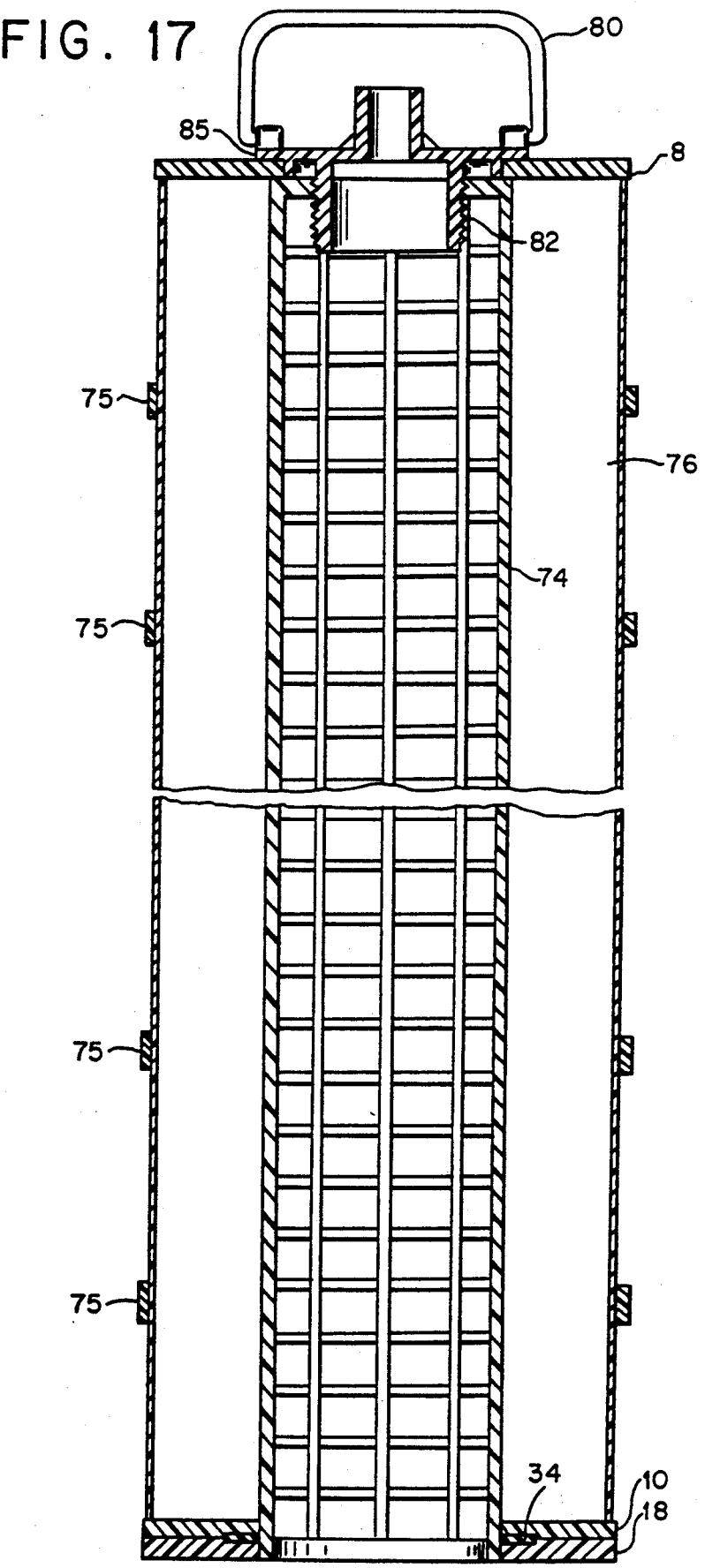
FIG. 17 is a cross sectional view of the filter cartridge assembly shown in FIG. 15 taken along line 17—17.

A sixth embodiment of the filter cartridge assembly 1 previously described is shown in FIGS. 15, 16 and 17. The filter cartridge assembly 1 includes a filter cartridge element 2 having bands or straps 75 and a reusable core assembly 4 as in the previous embodiment shown in FIGS. 1-4. However, in the embodiment shown in FIGS. 15-17, an elongated filter medium 76 replaces the filter medium 6, and an elongated tubular core 74 replaces the tubular core 16. The filter cartridge element 76 has a first end cap 8 which has an opening 3 through its thickness and communicates with the filter cartridge central bore 12.

As described below, the dimension of the first end cap opening 3 is such that it is adapted to receive a nipple 78. The nipple 78 is in the form of a tubular structure including a lower threaded portion 82 and a flange 84 extending radially from the main body of the nipple. The flange 84 includes the lip 85 protruding from its periphery. A handle 80 is mounted on the nipple 78 and attached to the flange 84. The nipple 78 is removably mounted on the end cap 8 by having the flange 84 snugly received by the opening 3 with the lip 85 resting against the outer surface of the end cap 8, similar in many respects to the manner in which the nipple 62 is mounted on the filter cartridge element of the embodiment shown in FIG. 12.

The inner surface 86 of the tubular core's first end has a threaded portion 88. The tubular core threaded portion 88 is designed to mate with the threaded nipple portion 82.

The threaded nipple portion 82 mates with the tubular core threaded portion 88 and secures the filter cartridge element 76 to the core assembly 74. As with the embodiment of FIG. 12, the core assembly 74 and the nipple 18 shown in FIG. 16 provide longitudinal support to the filter cartridge element 2. When the nipple 78 is threaded into the core 74 with the filter cartridge element 2 mounted on the core, the lip 85 rests against the surface of the cartridge end cap 8 to help retain the filter cartridge element on the core assembly. If pressure is exerted on the end cap 8 of the filter cartridge element, the inside surface of the end cap 8 will engage the axial end of the core 74, as the diameter of the opening 3 is made smaller than the outer diameter of the core 74. Finally, the predetermined overall length of the replacement filter cartridge assembly is such that the entire assembly may be secured in place by the original filter canister housing.

Figure 18:
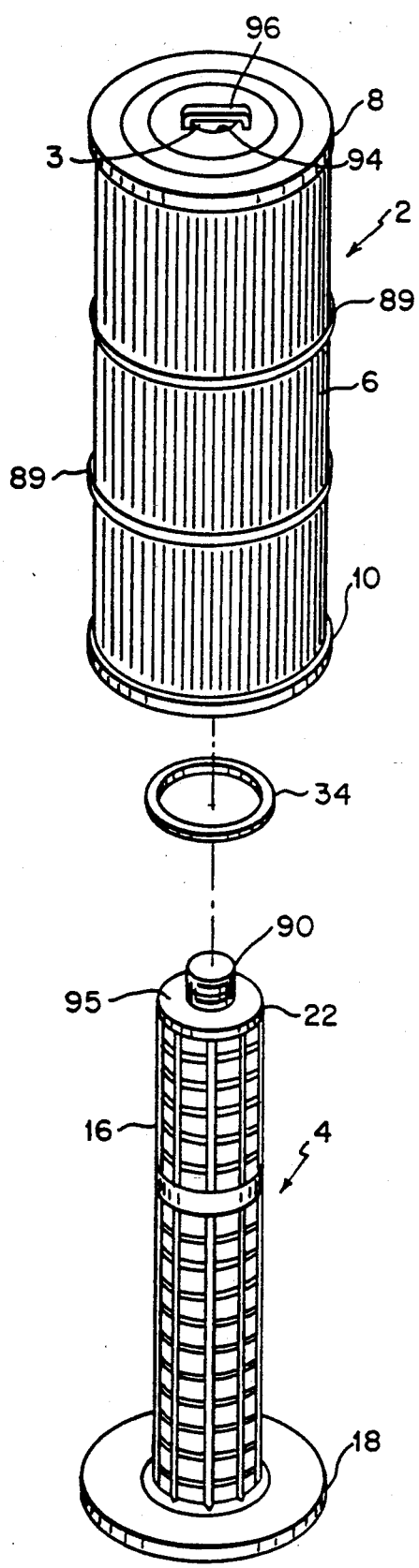
FIG. 18 is an exploded view of a seventh embodiment of the filter cartridge assembly of the present invention.
Figure 19:
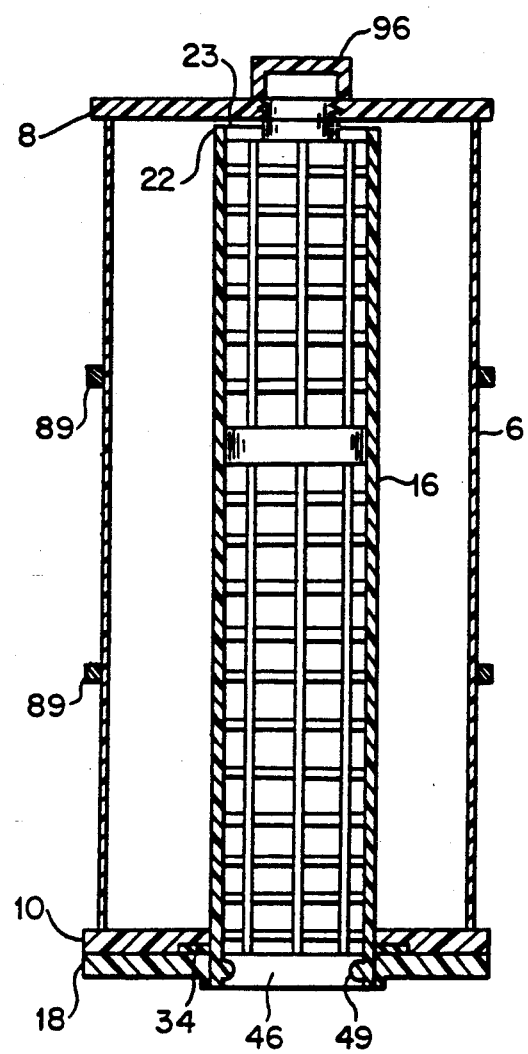
FIG. 19 is a cross sectional view of the filter cartridge assembly shown in FIG. 18 taken along the longitudinal axis.

A seventh embodiment of the filter cartridge assembly 1 previously described is shown in FIGS. 18 and 19. The filter cartridge assembly 1 includes a filter cartridge element 2 with bands or straps 89 and a reusable core assembly 4 as in the previous embodiment shown in FIGS. 1-4. However, in the embodiment of FIGS. 18 and 19, the tubular core 16 has a threaded portion 90 having a cylindrical shape. The threaded portion 90 extends axially from the first axial end top surface 23 of the tubular core 16. The filter cartridge element first end cap 8 has an opening 3 formed through its thickness and communicating with the filter cartridge central bore 12. The opening 3 has a threaded perimeter 94. The threaded perimeter 94 of the opening 3 couples with the threaded core portion 90. The threaded core portion 90 has a diameter which is less than the outer diameter of the core 16 to define a shoulder 95 and so that the shoulder 95 of the core assembly can contact the inside surface of the end cap 8 when the threaded portion 90 is fully screwed into the threaded opening 94 to provide longitudinal support for the filter cartridge element. The core assembly also supports the filter cartridge element by the engagement of the threaded core portion 90 with the end cap 8.

Also, the cartridge first end cap 8 may include a handle 96. The outer side 26 of the filter cartridge end cap 8 has the first end cap handle 96 mounted to it. Coupling the threaded core portion 90 of the core assembly 4 with the threaded opening 94 of the filter cartridge element 2 secures the filter cartridge element 2 and the core assembly 4 together. The filter cartridge handle 96 assists in engaging and disengaging the core assembly 4 from the filter cartridge element 2. The handle 96 further assists in lifting and carrying the filter cartridge assembly 1 or the filter cartridge element 2.

As with the embodiment shown in FIG. 6, the sealing end cap 18 of the present embodiment includes an opening 46 formed through its thickness. The opening is provided so that the cartridge assembly may engage a standard fitting (not shown) mounted in the bottom of the filter canister in which the cartridge assembly is adapted to be mounted, and is further provided with an inwardly protruding rib 49 to form a watertight seal with the fitting.

An eighth embodiment of the filter cartridge assembly 1 previously described is shown in FIGS. 20 and 21. The filter cartridge assembly 1 includes a filter cartridge element 2 and a reusable core assembly 4, as in the previous embodiments shown in FIGS. 1–4. However, in the embodiment of FIGS. 20 and 21, the filter cartridge second end cap 10 includes a flange 98 in the shape of a ring. The outer surface 32 of the filter cartridge second end cap 10 has flange 98 mounted on it and protruding normally to the outer surface.

The flange 98 has an inner surface 100 and an outer surface 102. The inside diameter of flange 98 is greater than the filter cartridge second end cap opening 14 to define a lip 104. The lip 104 on the filter cartridge second end cap 10 is between the flange 98 and the opening 14 in the second end cap 10.

The core assembly 4 includes a support member 106 in the shape of a ring. The second axial end 20 of the tubular core has support member 106 mounted on it. The support member 106 has a top surface 108, a bottom surface 110, an inner surface 112 and an outer surface 114. The inner surface 112 has a threaded portion 116 formed on its inside perimeter.

The support member 106 is dimensioned such that, when the core assembly 4 engages the filter cartridge element 2, the support member bottom surface 110 engages the filter cartridge second end cap lip 104. The support member outer wall 114 snugly fits within the flange 98 and against the inner wall 100 and forms a press-fitted seal therewith. The support member 106 abuts against the filter cartridge second end cap lip 104. The flange 98 attached to the filter cartridge second end cap 10 secures laterally the support member 106 on the second axial end 20 of the tubular core 16. The support member threaded portion 116 enables securing the filter cartridge assembly 1 to a mating male fixture. A compatible filter apparatus having a canister which accepts the filter cartridge assembly 1 may include such a mating male fixture.

The outer diameter of the core 16 is greater than the diameter of the opening 3 formed in the end cap 8 of the filter cartridge. The length of the core is such that, when mounted in the filter cartridge element 2 with the bottom surface 110 of the support member 106 resting against the lip 104 of the second end cap 10, the axial end 22 of the core 16 engages the inside surface of the end cap 8 to provide longitudinal support for the filter cartridge element. Furthermore, opening 3 may include an inwardly protruding rib 49, as in the embodiment of FIG. 19, to slide over an existing standpipe in the filter canister and engage a fitting mounted in the bottom of the canister.

A ninth embodiment of the filter cartridge assembly 1 previously described is shown in FIGS. 22 and 23. The filter cartridge assembly 1 includes a filter cartridge element 2, and a reusable core assembly 4 as in the previous embodiment shown in FIGS. 1–4. Further, the filter cartridge element 2 includes a ring-shaped flange 98, and the second axial end 20 of the core assembly 4 includes a support member 106 as in the previous embodiment shown in FIGS. 20 and 21. However, in the embodiment of FIGS. 22 and 23, the outer surface 114 of the support member 106 includes threaded portion 118 formed in the outer surface 114. The flange 98 of the filter cartridge end cap 10 includes a threaded portion 120 formed in the inner surface 100 of the flange. The flange inner surface threaded portion 120 is designed to mate with the support member outer surface threaded portion 118.

Engaging the flange inner surface threaded portion 120 with the support member outer surface threaded portion 118 secures the core assembly 4 and the filter cartridge element 2 together. However, disengaging the filter cartridge element 2 and the core assembly 4 is easily done by unscrewing the core assembly 4 and pulling it out of the filter cartridge central bore 12.

As in the embodiment shown in FIGS. 20 and 21, the diameter of the core 16 is greater than the diameter of the opening 3 and the length of the core is predetermined such that the axial end 22 engages the end cap 8 of the filter cartridge element when the core assembly is fully mounted on the filter cartridge to provide longitudinal support for the filter cartridge element.

Finally, the predetermined overall lengths of the replacement filter cartridge assemblies in each of the eighth and ninth embodiments are such that the entire assemblies are secured in place by the original filter cartridge housings, thus ensuring compatibility with the manufacturer's original equipment.

A tenth embodiment of the filter cartridge assembly 1 previously described is shown in FIGS. 24 and 25. The filter cartridge assembly 1 includes a filter cartridge element 2 and a reusable core assembly 4 as in the previous embodiment shown in FIGS. 1–4. Additionally, the core assembly 4 includes a ring-shaped support member 106 and a filter cartridge second end cap ring-shaped flange 98 as in the previous embodiment shown in FIGS. 20–23. However, in the embodiment of FIGS. 24 and 25, the first axial end 22 of tubular core 16 includes a threaded portion 122 having a cylindrical shape defining a cylindrical outer surface 123.

More specifically, core portion 122 includes threads 124 formed in its cylindrical outer surface 123. The tubular core 16 has threaded core portion 122 mounted on its axial end and defining a shoulder 125, as in previous embodiments. The first end cap 8 of the filter cartridge element 2 has an opening 3 formed through its thickness and being in communication with the filter cartridge central bore 12. The diameter of the first end cap opening 3 is less than the diameter of the tubular core 16, but is equal to or greater than the diameter of the threaded core portion 122.

The dimensions of the threaded core portion 122 is such that, when the core assembly 4 is mounted on the filter cartridge element 2, the threaded portion 122 extends beyond the filter cartridge first end cap 8.

A cap member 126 having a tubular shape includes an inner surface 128 with threads formed in its inner surface 128. Further, the cap member 126 includes a radially extending rim 130. The design of the rim is such that the rim 130 engages the outer surface 26 of the filter cartridge first end cap 8 when the cap member 126 is screwed onto the threaded core portion 122. The threads of the cap member 126 mate with the threads 124 of core portion 122. Coupling threads 124 of the core with the mating cap member inner surface threads 116 secures the filter cartridge element 2 to the core assembly 4. The filter cartridge element 2 and the core assembly 4 disengage easily by unscrewing the cap member 126 from the threaded core portion 122. Either one of the threaded core portion 122 or the cap member 126 may be closed at one of its ends so that a watertight seal is formed with the first end cap of the filter cartridge element.

The length of the core 16 is such that the shoulder 125 of its axial end 22 contacts the inner surface of the cartridge end cap 8 when the core assembly is mounted on the filter cartridge element and thus provides longitudinal support for the filter cartridge element. The end cap 126 secures the core assembly to the filter cartridge element.

As is evident from the above description, the filter cartridge assembly of the present invention provides a filter cartridge element which is longitudinally supported by a reusable core assembly. This prevents distortion of the filter cartridge element, thereby eliminating by-pass and unwanted damage to the filter cartridge end cap.

The core assembly of the present invention disengages easily from the filter cartridge element. Thus, the supporting core assembly may be removed from the filter cartridge element when the filter cartridge element needs to be replaced or cleaned, and may be reused on a clean filter cartridge element.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A replacement filter cartridge assembly for use in filtering a liquid, which comprises:
a filter cartridge element, the filter cartridge element including opposite first and second non-porous, rigid end caps and a pleated filter medium interposed between the end caps and arranged in a cylindrically shaped configuration to define a central bore extending longitudinally through the filter cartridge element, the first end cap having opposite inner and outer surfaces, and the second end cap having opposite inner and outer surfaces, the second end cap having an opening formed through the thickness thereof and being in communication with the central bore, the first and second end caps providing longitudinal support to the pleated filter medium; and
a reusable supporting core assembly, the supporting core assembly including a tubular core having opposite first and second ends, and further including a sealing end cap mounted on the second end thereof, the sealing end cap having opposite inner and outer surfaces, the outer diameter of the tubular core being less than the inner diameters of the second end cap opening and the central bore of the filter cartridge element to allow the tubular core to be received by the central bore and to allow the supporting core assembly to be removably mounted on the filter cartridge element, the outer diameter of the tubular core substantially contacting the pleated filter medium of the filter cartridge element to provide lateral support to the pleated filter medium when the supporting core assembly is mounted thereon, the tubular core having a predetermined length such that the first end thereof is engagable with the inner surface of the first end cap of the filter cartridge element, and the inner surface of the sealing end cap is engagable with the outer surface of the second end cap of the filter cartridge element thereby providing longitudinal support to the filter cartridge element when the supporting core assembly is mounted thereon, the supporting core assembly being mountable on the filter cartridge element and removable therefrom for reuse.

2. The replacement filter cartridge assembly of claim 1, which further comprises a seal having an annular shape, and wherein the seal includes an inside diameter which is larger than the diameter of the tubular core so that the tubular core is adapted to receive the seal; and wherein at least one of the filter cartridge second end cap outer surface and the sealing end cap inner surface includes a recess formed therein and adapted to at least partially receive the seal.

3. The replacement filter cartridge assembly of claim 1, wherein the second end cap of the filter cartridge element includes a sealing ring protruding from the outer surface thereof and situated near the periphery of the second end cap, the ring being engagable with the inner surface of the sealing end cap to form a watertight seal therewith.

4. The replacement filter cartridge assembly of claim 1, wherein the filter cartridge first end cap has an opening formed through the thickness thereof and being in communication with the central bore, wherein the tubular core has an exposed top surface, and wherein the opening has a smaller diameter than that of the exposed top surface of the tubular core.

5. The replacement filter cartridge assembly of claim 1, which further comprises a nipple, the nipple being in the form of a tubular member; wherein the tubular core sealing end cap includes an opening formed through the thickness thereof and being in communication with the central bore, the nipple being at least partially received by the sealing end cap opening; and wherein the filter cartridge element further includes a handle mounted on the outer surface of the first end cap.

6. The replacement filter cartridge assembly of claim 1, wherein the tubular core first end has an outer and inner perimeter surface, the outer perimeter surface having a threaded portion; and wherein the filter cartridge first end cap has an opening formed through the thickness thereof and being in communication with the central bore, the first end cap opening having a perimeter surface which is threaded to mate with the threaded portion of the tubular core.

7. The replacement filter cartridge assembly of claim 1, wherein the filter cartridge first end cap has an opening formed through the thickness thereof and being in communication with the central bore; wherein the opening has an inner perimeter which is threaded; and wherein the tubular core further includes a threaded portion extending axially from the first axial end thereof and adapted to engage the threaded opening of the filter cartridge first end cap.

8. The replacement filter cartridge assembly of claim 1, which further includes a handle mounted on one of the outer surface of the sealing end cap and the outer surface of the first end cap of the filter cartridge element.

9. The replacement filter cartridge assembly of claim 1, which further comprises a nipple, the nipple being formed as a tubular member and having a threaded portion; and wherein the filter cartridge first end cap has an opening formed through the thickness thereof and being in communication with the central bore, the first end cap opening having a predetermined diameter to at least partially receive and couple with the nipple, the threaded portion of the nipple extending at least partially into the filter cartridge central bore; and wherein the tubular core first end has an inner and outer perimeter surface, the inner perimeter surface including a threaded portion adapted to engage the threaded portion of the nipple.

10. A replacement filter cartridge assembly as defined by claim 7 wherein at least a part of the threaded portion of the tubular core protrudes through the threaded opening of the filter cartridge first end cap.

11. A replacement filter cartridge assembly for use in filtering a liquid, which comprises:

a filter cartridge element, the filter cartridge element including opposite first and second non-porous, rigid end caps and a pleated filter medium interposed between the end caps and arranged in a cylindrically shaped configuration to define a central bore extending longitudinally through the filter cartridge element, each of the first end cap and the second end cap having opposite inner and outer surfaces, and the second end cap having an opening formed through the thickness thereof and being in communication with the central bore, the first and second end caps providing longitudinal support to the pleated filter medium, the second end cap including a flange formed on the outer surface thereof, the flange being annular shaped and surrounding the perimeter of the second end cap opening, the flange having inner and outer surfaces; and a reusable supporting core assembly, the supporting core assembly including a tubular core having opposite first and second ends, and further including a support member mounted on the second end thereof, the support member including opposite inner and outer surfaces and opposite top and bottom surfaces, the inner surface of the support member being threaded, the outer diameter of the tubular core being less than the inner diameters of the second end cap opening and the central bore of the filter cartridge element to allow the tubular core to be received by the central bore and to allow the supporting core assembly to be removably mounted on the filter cartridge element, the outer diameter of the tubular core substantially contacting the pleated filter medium of the filter cartridge element to provide lateral support to the pleated filter medium, when the supporting core assembly is mounted thereon, the inner surface of the flange engaging the outer surface of the support member, the tubular core having a predetermined length such that the first end thereof is engagable with the inner surface of the first end cap, and the bottom surface of the support member being engagable with the outer surface of the second end cap thereby providing longitudinal support to the filter cartridge element when the supporting core assembly is mounted thereon, the supporting core assembly being mountable on the filter cartridge element and removable therefrom for reuse.

12. The replacement filter cartridge assembly of claim 11, wherein the outer surface of the support member includes a threaded portion; wherein the inner surface of the flange of the filter cartridge element includes a threaded portion; and wherein the threaded portion of the support member is adapted to engage the threaded portion of the flange of the filter cartridge element.

13. The replacement filter cartridge assembly of claim 12, wherein the tubular core includes a threaded core portion mounted on and extending from the first end thereof, the threaded core portion having a smaller diameter than the tubular core; and wherein the filter cartridge first end cap has a opening formed through the thickness thereof and being in communication with the central bore, the threaded core portion extending at least partially through the opening in the filter cartridge first end cap.

14. The replacement filter cartridge assembly of claim 13, wherein a portion of the threaded core portion extends beyond the outer surface of the first end cap; and which further comprises a cap member, the cap member being adapted to be threadingly mounted on the extended portion of the threaded core portion.

15. A reusable supporting core assembly for use with a filter cartridge element, the filter cartridge element having first and second non-porous, rigid end caps and a pleated filter medium interposed between the end caps and arranged in a cylindrically shaped configuration to define a central bore extending longitudinally through the filter cartridge element, each of the first and second end caps having opposite inner and outer surfaces, the second end cap having an opening formed through the thickness thereof and being in communication with the central bore, the reusable supporting core assembly comprising:

a tubular core, the tubular core having opposite first and second axial ends; and a sealing end cap, the sealing end cap being mounted on the second axial end of the tubular core, the sealing end cap having opposite inner and outer surfaces;

the outer diameter of the tubular core being less than the inner diameters of the second end opening and the central bore of the filter cartridge element to allow the tubular core to be received by the central bore and to allow the tubular core to be removably mounted on the filter cartridge element, the outer diameter of the tubular core substantially contacting the filter cartridge element to provide lateral support to the filter cartridge element when the supporting core assembly is mounted thereon;

the tubular core having a predetermined length such that the first axial end thereof is adapted to engage the first end cap of the filter cartridge element, and the inner surface of the sealing end cap is adapted to engage the outer surface of the second end cap of the filter cartridge element to provide longitudinal support to the filter cartridge element when the supporting core assembly is mounted thereon, the supporting core assembly being adapted to be mounted on the filter cartridge element and removable therefrom for reuse.

16. A filter cartridge element for use with a reusable supporting core assembly, the supporting core assembly including a tubular core having opposite first and second axial ends, and a sealing end cap mounted on the second end thereof, the sealing end cap having opposite inner and outer surfaces, the filter cartridge element comprising;

opposite first and second non-porous, rigid end caps; and a pleated filter medium interposed between the end caps and arranged in a cylindrically shaped configuration to define a central bore extending longitudinally through the filter cartridge element, each of the first and second end caps having opposite inner and outer surfaces, the second end cap having an opening formed through the thickness thereof and being in communication with the central bore, the inner diameter of the second end cap opening and the central bore of the filter cartridge element being greater than the outer diameter of the tubular core of the reusable supporting core assembly to allow the tubular core to be received by the central bore and to allow the supporting core assembly to be removably mounted on the filter cartridge element;

the longitudinal length of the filter cartridge element with respect to the tubular core being such that inner surface of the first end cap is adapted to engage the first axial end of the tubular core, the outer diameter of the tubular core substantially contacting the pleated filter medium to provide lateral support to the pleated filter medium, and the outer surface of the second end cap of the filter cartridge element is adapted to engage the inner surface of the sealing end cap when the filter cartridge element is mounted on the supporting core assembly.

* * * * *